Figure 1:
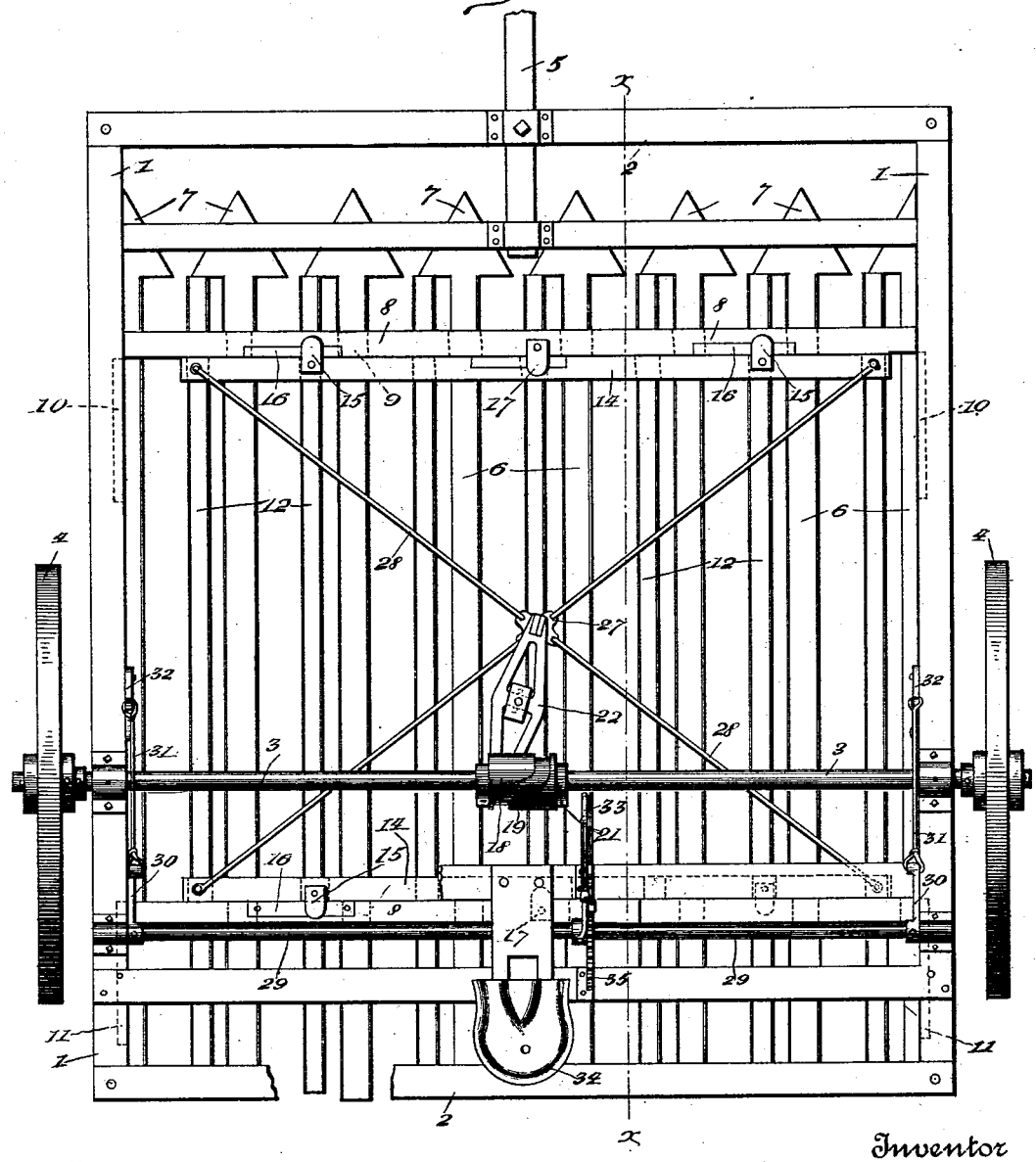

(No Model.)

2 Sheets—Sheet 1.

C. WATERMAN.
WEED PULLER.

No. 562,991.

Patented June 30, 1896.

Witnesses
Theo. L. Gatchel,
William P. Wilson.

Inventor
Charles Waterman.
By F. Benjamin
Attorney (No Model.) C. WATERMAN. 2 Sheets—Sheet 2.
WEED PULLER.
No. 562,991. Patented June 30, 1896.
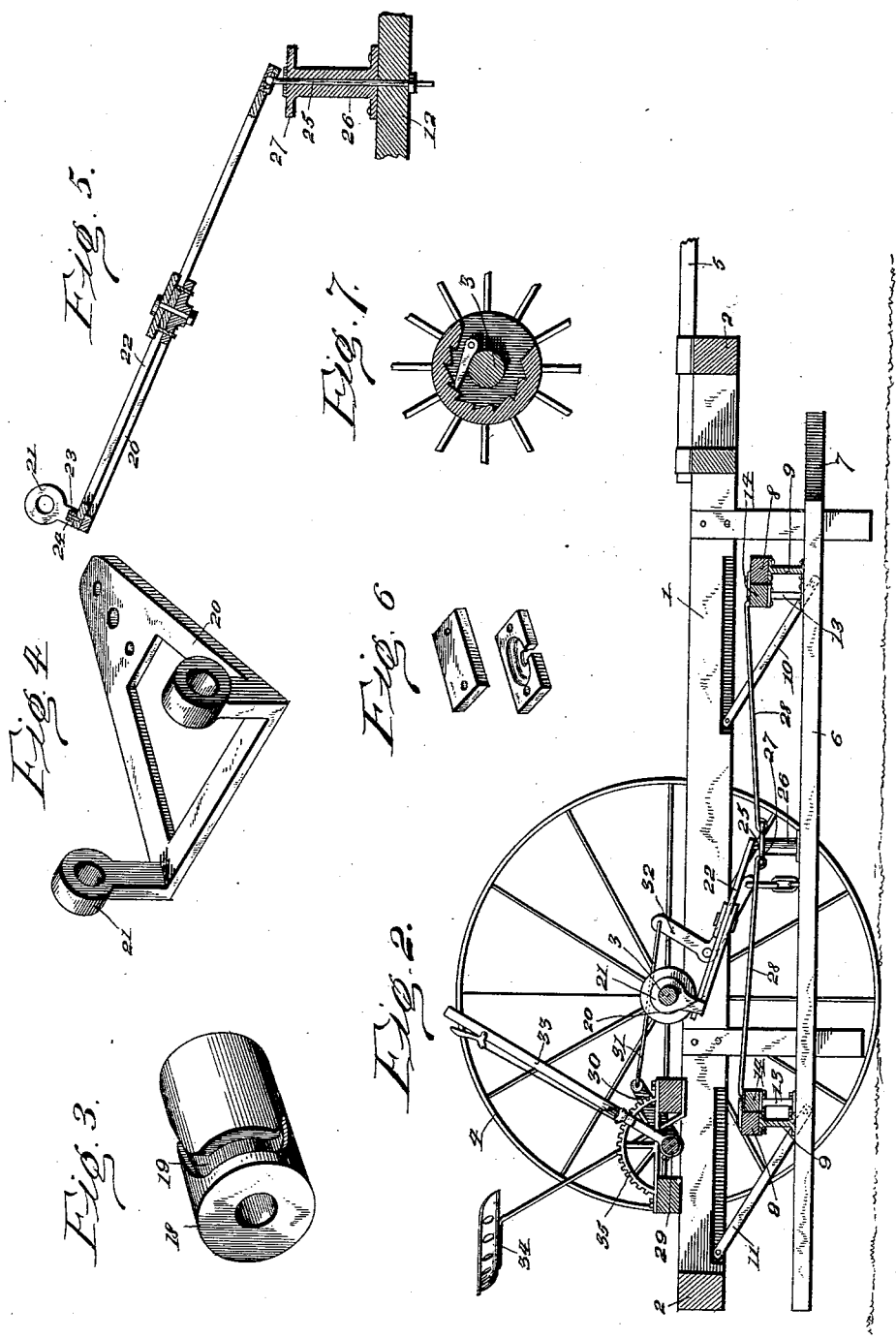
Witnesses
Theo. T. Gatchel.
William P. Wilson
Inventor:
Charles Waterman,
By F. Benjamin,
Attorney United States Patent Office.

CHARLES WATERMAN, OF BOZEMAN, MONTANA.

WEED-PULLER.

SPECIFICATION forming part of Letters Patent No. 562,991, dated June 30, 1896.

Application filed July 8, 1895. Serial No. 555,263. (No model.)

*To all whom it may concern:*

Be it known that I, CHARLES WATERMAN, a citizen of the United States, residing at Bozeman, in the county of Gallatin and State of Montana, have invented certain new and useful Improvements in Weed-Pullers; and I do hereby declare the following to be a full, clear, and exact description of the invention, such as will enable others skilled in the art to which it appertains to make and use the same.

In certain sections of the country farmers are troubled a good deal by reason of the fact that wild mustard and other weeds grow up between the young grain, blossom out and take from the nourishment which the grain would naturally receive. Various means have been adopted for removing these weeds, but in all cases they have proved unsatisfactory by reason of the labor and expense attendant upon removing the same. I have devised a machine adapted for this purpose which is simple in construction, automatic in its action, and which will remove the weeds from a large field of grain in a very short period of time.

The invention consists of a framework mounted upon suitable wheels of the type of a sulky-plow, a frame of rigid slats pivotally connected to the main frame, a framework of laterally-moving slats slidingly connected with the framework of rigid slats, means for raising and lowering the slat-frames for the purpose of accommodating the machine to the height of the grain and weeds and means actuated by the forward movement of the machine for shifting the movable slat-frame alternately in opposite directions.

The invention also consists in other details of construction and combinations of parts, which will be more fully hereinafter described and claimed.

In the drawings forming a part of this specification, Figure 1 represents a plan view of my device complete. Fig. 2 is a vertical section through the same, taken on the line $x\,x$ of Fig. 1. Fig. 3 is a detail perspective view of a drum secured to the main drive-shaft of the machine and provided with a cam-groove. Figs. 4, 5, and 6 are detailed views of different parts of the machine.

Like reference-numerals indicate like parts in the various views.

The main framework of the machine is made up of a pair of longitudinal beams 1 1, and cross-beams 2 2, connecting the beams 1 at their ends. Mounted in suitable boxes on the beams 1 is the main drive-shaft 3, to which are keyed or otherwise secured the wheels 4 upon which the machine is supported. A tongue 5 or other suitable form of draft appliance is secured to the forward end of the frame.

6 6 represent a series of slats having spear-shaped front ends 7 and connected at points near the front and rear thereof by cross-beams 8 8, the said beams being separated from the slats 6 by means of a series of spool-shaped castings 9, as clearly shown. These slats 6, with their connecting cross-beams 8, form a rigid frame which is pivotally connected to the longitudinal beams 1 of the main frame by means of links 10 and 11, attached, respectively, to the front and rear ends of said rigid slat frame.

12 12 represent a series of slats located alternately between the slats 6, connected through spool-shaped castings 13 with cross-beams 14, as clearly shown. The slats 12 are slightly shorter than the slats 6 and their forward ends fit just behind the spear-shaped heads 7 of the slats 6. The cross-beams 14 are located just inside the cross-beams 8, and the slat frame made up of the slats 12, castings 13, and cross-beams 14 is adapted to move laterally of the machine. Guide-lugs 15 are secured to the upper side of the cross-beams 14 and project over beyond the cross-beams 8, bearing against wear-plates 16 thereon. Similar lugs 17 are secured to the cross-beams 8 and project in an opposite direction over the top of the cross-beams 14, the said lugs forming guides between the movable stationary slat frames and preventing upward or downward relative movement thereof.

Secured to the main drive-shaft 3 at about its center is a cylindrical drum 18, having a cam-groove 19 therein, as clearly shown in Figs. 1 and 3. This groove 19 runs parallel to the outer edge of the drum 18 on opposite sides for a distance of about one-fourth the circumference of said drum, the two parallel portions thereof being connected by an angular portion whose turn from said parallel portions is relatively abrupt.

20 represents a bracket having upwardly-extending perforated arms 21, through which pass the main drive-shaft 3, said arms being located one on each side of the drum 18 and having a loose connection with said drive-shaft. In the forward end of the bracket 20 is fulcrumed a lever 22, having a pintle 23 projecting upwardly from its rear end, upon which is mounted a roller 24, which fits the cam-groove 19 in the drum 18.

Rotatably secured through a shaft 25 to the middle slat 12 is an upright 26, having radially-extending horizontal arms 27 thereon. To these arms 27 are pivotally connected pitmen 28, which are connected, respectively, at their opposite ends to the four corners of the movable slat frame, a loose connection permitting a small degree of lost motion being made between the forward end of the lever 22 and the shaft 25.

By the construction just described it will be seen that the forward movement of the machine will cause a rotation of the main drive-shaft 3 and the drum 18 secured thereto. By reason of the engagement of the roller 24 on the lever 22 with the cam-groove 19 in the drum 18 a vibratory movement is imparted to the lever 22, which transmits the same through the pitmen 28 to the movable slat-frame. By reason of the parallel portions of the groove 19 the said movable slat frame is held for a short period of time at the end of each stroke. The slat frames are so adjusted that the forward ends thereof are in a horizontal plane just above the tops of the grain, so that the weeds which extend above the grain pass between the rigid slats 6 and the movable slats 12. The open portion between the rigid and movable slats is filled with weeds and then the movable slats are shifted by the mechanism described, so as to tightly grip these weeds. They are held for a short period in a clamped position long enough for the forward movement of the machine to pull them from the ground when the reverse operation takes place.

During the pulling operation on one side of the movable slats, the weeds are being collected in the open space on the opposite side thereof.

In a device of this kind it is necessary that some means be provided for raising and lowering the slat frames to accommodate them to grain and weeds of different heights. For this purpose I provide a shaft 29, rotatably mounted in bearings in the longitudinal beams 1, to which are connected at their outer ends arms 30 30. These connect through pitmen 31 to the ends of the bell-crank levers 32, fulcrumed in the beams 1, and these bell-crank levers are connected at their lower ends in any suitable way to the outside slats 6. The shaft 29 is turned by means of a lever 33, secured to said shaft at a point adjacent to the seat 34, which lever acts in engagement with a sector 35, and adjusts the shaft 29 at any point.

It will be quite evident that the forward rotation of the shaft 29 by turning the lever 22 will lower the slat frames and a reverse movement will elevate them.

Having thus described the invention, what is claimed as new is—

1. In a weed-puller, the combination with the main frame mounted upon wheels, of a rigid slat frame pivotally mounted upon said main frame, the slats thereof being slightly separated and provided with spear-pointed front ends, of a movable slat frame, the slats of which fit the spaces between the slats in the rigid frame and the forward ends of which fit just back of the spear-heads of said rigid slats, and means for shifting said movable slat frame alternately in opposite directions, substantially as and for the purpose described.

2. In a weed-puller, the combination of the main frame, a shaft mounted in bearings in said main frame, wheels rigidly secured to the outer ends of said shaft, a drum secured to said shaft having a cam-groove therein, a bracket loosely mounted on said shaft, a lever fulcrumed in said bracket, one arm of which has a projecting roller thereon which fits a cam-groove in said drum, a rigid slat frame pivotally connected to said main frame, the slats thereof being slightly separated and formed with spear-shaped forward ends, cross-beams connecting said slats, a movable slat frame made up of a series of slats connected by suitable cross-beams and fitting spaces between the slats of said rigid frame, an upright rotatably mounted on the center of said movable slats, pitmen connecting the corners of said movable frame with said upright and a loose connection between the forward end of said lever and said upright, substantially as and for the purpose described.

3. In a weed-puller, the combination of the main frame, a shaft mounted in bearings in said main frame, wheels rigidly secured to the outer ends of said shaft, a drum secured to said shaft and having a cam-groove therein, a bracket loosely mounted on said shaft, a lever fulcrumed in said bracket, one arm of which has a projecting roller thereon which fits a cam-groove in said drum, a rigid slat frame made up of a series of spear-pointed slats slightly separated from one another and cross-beams connecting said slats through a series of blocks or castings, a movable slat frame made up of a series of slats fitting the spaces between the slats of said rigid frame and cross-beams connected thereto through blocks or castings, guide-lugs secured to the upper surface of the cross-beams connecting said rigid and movable slat frames, projecting over the top of the adjacent cross-beams, an upright rotatably mounted in the center of said movable slats, pitmen connecting the corners of said movable slat frame with said upright and a loose connection between the forward end of said lever and said upright, substantially as and for the purpose described.

4. In a weed-puller, the combination of the main frame, a shaft mounted in bearings in said main frame, wheels rigidly secured to the outer ends of said shaft, a drum secured to said shaft and having a cam-groove therein, a bracket loosely mounted on said shaft, a lever fulcrumed in said bracket, one arm of which has a projecting roller thereon which fits the cam-groove in said drum, a rigid slat frame made up of a series of spear-pointed slats slightly separated from one another and cross-beams connecting said slats through a series of blocks or castings, a movable slat frame made up of a series of slats fitting the spaces between the slats of said rigid frame and cross-beams connected thereto through blocks or castings, guide-lugs secured to the upper surface of the cross-beams connecting said rigid and movable slat frames, projecting over the top of the adjacent cross-beams, an upright rotatably mounted in the center of said movable slats, pitmen connecting the corners of said movable slat frame with said upright and a loose connection between the forward end of said lever and said upright, a shaft mounted in bearings in said main frame having an operating-lever thereon which acts in engagement with a sector on a stationary part of said frame, arms on the outer end of said shaft, bell-crank levers fulcrumed in said main frame and connected to said slat frame, and pitmen connecting the forward ends of said arms and the upper ends of said bell-crank levers, substantially as and for the purpose described.

In testimony whereof I have signed this specification in the presence of two subscribing witnesses.

CHARLES WATERMAN.

Witnesses:
WILLIAM N. BOYLE,
WILLIAM H. ARNOLD.